United States Patent
Cho et al.

(10) Patent No.: US 11,118,040 B2
(45) Date of Patent: Sep. 14, 2021

(54) POLYETHYLENE RESIN FILM

(71) Applicant: LG Chem, Ltd., Seoul (KR)

(72) Inventors: Sol Cho, Daejeon (KR); Yi Young Choi, Daejeon (KR); Chang Hwan Jang, Daejeon (KR); Seyoung Kim, Daejeon (KR); Sung Min Lee, Daejeon (KR); Seul Ki Im, Daejeon (KR); Jinyoung Lee, Daejeon (KR); Hyojoon Lee, Daejeon (KR)

(73) Assignee: LG Chem, Ltd.

( * ) Notice: Subject to any disclaimer, the term of this patent is extended or adjusted under 35 U.S.C. 154(b) by 86 days.

(21) Appl. No.: 16/487,715

(22) PCT Filed: Dec. 3, 2018

(86) PCT No.: PCT/KR2018/015192
§ 371 (c)(1),
(2) Date: Aug. 21, 2019

(87) PCT Pub. No.: WO2019/124817
PCT Pub. Date: Jun. 27, 2019

(65) Prior Publication Data
US 2020/0231789 A1   Jul. 23, 2020

(30) Foreign Application Priority Data

Dec. 18, 2017 (KR) .................. 10-2017-0174514
Nov. 30, 2018 (KR) .................. 10-2018-0152915

(51) Int. Cl.
*C08L 23/08* (2006.01)
*C08L 23/16* (2006.01)

(52) U.S. Cl.
CPC ........... *C08L 23/0815* (2013.01); *C08L 23/16* (2013.01); *C08L 2201/10* (2013.01); *C08L 2203/16* (2013.01); *C08L 2205/025* (2013.01)

(58) Field of Classification Search
CPC .. C08F 23/16; C08F 23/0807; C08F 23/0815; C08L 2203/16; C08L 2201/10
See application file for complete search history.

(56) References Cited

U.S. PATENT DOCUMENTS 6,667,375 B1 *  12/2003  Mitsuno ................ C08F 210/16
                                                         526/234
7,432,328 B2 * 10/2008  Jaker ..................... C08F 210/16
                                                         525/191

(Continued)

FOREIGN PATENT DOCUMENTS

CN        1286272 A       3/2001
CN      107001731 A       8/2017

(Continued)

OTHER PUBLICATIONS

Extended European Search Report including the Written Opinion for Application No. EP 18892677.8 dated May 14, 2020, 12 pages.

(Continued)

*Primary Examiner* — Rip A Lee
(74) *Attorney, Agent, or Firm* — Lerner, David, Littenberg, Krumholz & Mentlik, LLP

(57) ABSTRACT

Provided is a polyethylene resin film exhibiting more improved transparency while exhibiting excellent processability and mechanical properties. The polyethylene resin film having a density of 0.910 g/cm³ to 0.930 g/cm³, and a haze of 10% or less at a thickness of 90 μm to 110 μm includes a first polyethylene resin and a second polyethylene resin at a weight ratio of 6:4 to 8:2, wherein the first polyethylene resin has an MFRR (21.6/2.16) value of 27 to 40, and the second polyethylene resin has an MFRR (21.6/2.16) value of 15 to 23, and the MFRR (21.6/2.16) value is obtained by dividing a melt flow rate (MFR$_{21.6}$) measured at a temperature of 230° C. under a load of 21.6 kg in accordance with ISO 1133 by a melt flow rate (MFR$_{2.16}$)

(Continued)

measured at a temperature of 230° C. under a load of 2.16 kg in accordance with ISO 1133.

13 Claims, 1 Drawing Sheet

(56) References Cited

U.S. PATENT DOCUMENTS

| | | | | |
|---|---|---|---|---|
| 8,722,804 | B2* | 5/2014 | Lue | C08L 23/0815 |
| | | | | 525/191 |
| 9,096,745 | B2* | 8/2015 | Lam | C08L 23/08 |
| 9,127,151 | B2* | 9/2015 | Matsunaga | C10M 143/04 |
| 10,619,020 | B2* | 4/2020 | Rosa | B32B 27/08 |
| 11,015,043 | B2* | 5/2021 | Flory | C08L 23/06 |
| 2009/0099315 | A1 | 4/2009 | Kipke et al. | |
| 2009/0246433 | A1* | 10/2009 | Michie | B29B 7/726 |
| | | | | 428/36.9 |
| 2012/0065335 | A1 | 3/2012 | Kipke et al. | |
| 2014/0179873 | A1 | 6/2014 | Lam et al. | |
| 2015/0284552 | A1 | 10/2015 | Lam et al. | |
| 2016/0009908 | A1 | 1/2016 | Chiba et al. | |
| 2016/0032034 | A1 | 2/2016 | Farley et al. | |
| 2016/0177073 | A1 | 6/2016 | Demirors et al. | |
| 2017/0029542 | A1 | 2/2017 | Mariott et al. | |
| 2017/0204246 | A1 | 7/2017 | Adetunji et al. | |
| 2017/0349734 | A1 | 12/2017 | Habibi et al. | |
| 2018/0016372 | A1 | 1/2018 | Kwon et al. | |
| 2018/0251584 | A1 | 9/2018 | Cho et al. | |
| 2020/0017667 | A1* | 1/2020 | Wang | C08L 23/06 |
| 2020/0056004 | A1* | 2/2020 | Zhu | C08J 5/18 |

FOREIGN PATENT DOCUMENTS

| | | | |
|---|---|---|---|
| CN | 107250175 | A | 10/2017 |
| EP | 1081166 | A2 | 3/2001 |
| EP | 3241854 | A1 | 11/2017 |
| EP | 3339336 | A1 | 6/2018 |
| JP | 2006274162 | A | 10/2006 |
| JP | 2010031270 | A | 2/2010 |
| JP | 2012207150 | A | 10/2012 |
| JP | 2014165113 | A | 9/2014 |
| KR | 20080080103 | A | 9/2008 |
| KR | 101504434 | B1 | 3/2015 |
| KR | 20150099543 | A | 8/2015 |
| KR | 20150132398 | A | 11/2015 |
| KR | 20170041727 | A | 4/2017 |
| KR | 20170099694 | A | 9/2017 |
| KR | 20170107984 | A | 9/2017 |

OTHER PUBLICATIONS

International Search Report for Application No. PCT/KR2018/015192 dated Mar. 18, 2019, 2 pages.
Search Report from First Office Action for Chinese Application No. 201880013994.7 dated Jul. 6, 2021; 3 pages.

\* cited by examiner

[FIG. 1]
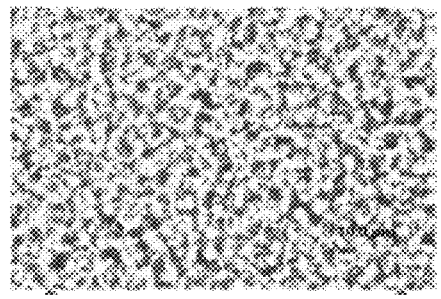
[FIG. 2]
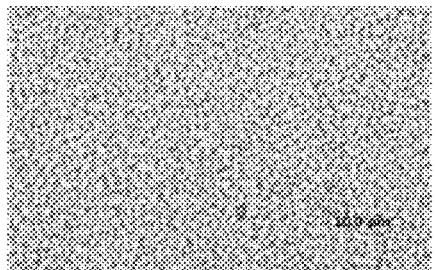
[FIG. 3]
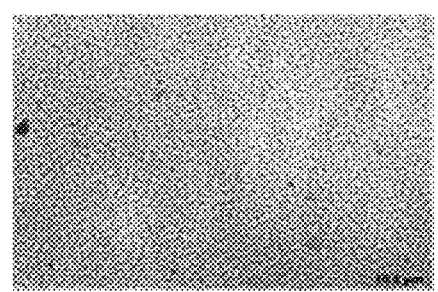

POLYETHYLENE RESIN FILM

CROSS-REFERENCE TO RELATED APPLICATION

The present application is a national phase entry under 35 U.S.C. § 371 of International Application No. PCT/KR2018/015192 filed Dec. 3, 2018, which claims priority from Korean Patent Application Nos. 10-2017-0174514 filed Dec. 18, 2017 and Korean Patent Application No. 10-2018-0152915 filed Nov. 30, 2018, all of which are incorporated herein by reference.

TECHNICAL FIELD

The present invention relates to a polyethylene resin film exhibiting more improved transparency while exhibiting excellent processability and mechanical properties.

BACKGROUND

Although existing LLDPEs (linear low-density polyethylenes) have excellent mechanical properties, they have poor bubble stability, and thus there is a problem in that it is difficult to stably form a film by a melt blown process, etc. This film also has disadvantages of a very high haze and poor transparency.

To solve these problems, a method of using a blend of LLDPE and LDPE (low-density polyethylene) has been suggested. When the method of adding LDPE to LLDPE is used, bubble stability is improved, and as a result, a blown film may be stably formed by the melt blown process. However, the method of adding LDPE to LLDPE generates a problem of remarkably reducing mechanical properties of the existing LLDPE, even though a very small amount of LDPE is added. Further, although this method is used, transparency is greatly reduced with increasing thickness of the film.

Meanwhile, a new polyethylene resin, in which the above-described poor processability and bubble stability of LLDPE are improved, has been recently developed (see Korean Patent Publication No. 2017-0099694, etc.). However, when this new polyethylene resin is used to manufacture a film, there are also disadvantages in that haze is relatively high and transparency is not satisfactory.

Technical Problem

Accordingly, the present invention provides a polyethylene resin film exhibiting more improved transparency while exhibiting excellent processability and mechanical properties.

Technical Solution

The present invention provides a polyethylene resin film having a density of 0.910 g/cm$^3$ to 0.930 g/cm$^3$, including a first polyethylene resin and a second polyethylene resin at a weight ratio of 6:4 to 8:2, wherein the first and second polyethylene resins have different MFRR (21.6/2.16) values, the MFRR (21.6/2.16) value obtained by dividing a melt flow rate (MFR$_{21.6}$) measured at a temperature of 230° C. under a load of 21.6 kg in accordance with ISO 1133 by a melt flow rate (MFR$_{2.16}$) measured at a temperature of 230° C. under a load of 2.16 kg in accordance with ISO 1133, and the first polyethylene resin has an MFRR (21.6/2.16) value of 27 to 40, and the second polyethylene resin has an MFRR (21.6/2.16) value of 15 to 23, and having a haze of 10% or less at a thickness of 90 μm to 110 μm.

Effect of the Invention

According to the present invention, provided is a polyethylene resin film exhibiting more improved transparency while exhibiting excellent mechanical properties, processability, bubble stability, etc.

BRIEF DESCRIPTION OF DRAWINGS

FIG. 1 is an optical microscopic image of a polyethylene resin film of Comparative Example 2;

FIG. 2 is an optical microscopic image of a polyethylene resin film of Comparative Example 3; and FIG. 3 is an optical microscopic image of a polyethylene resin film of Example 1.

DETAILED DESCRIPTION OF THE EMBODIMENTS

Hereinafter, a polyethylene resin film according to specific embodiments of the present invention will be described.

According to one embodiment of the present invention, provided is a polyethylene resin film having a density of 0.910 g/cm$^3$ to 0.930 g/cm$^3$, including a first polyethylene resin and a second polyethylene resin at a weight ratio of 6:4 to 8:2, wherein the first and second polyethylene resins have different MFRR (21.6/2.16) values, the MFRR (21.6/2.16) value obtained by dividing a melt flow rate (MFR$_{21.6}$) measured at a temperature of 230° C. under a load of 21.6 kg in accordance with ISO 1133 by a melt flow rate (MFR$_{2.16}$) measured at a temperature of 230° C. under a load of 2.16 kg in accordance with ISO 1133, and the first polyethylene resin has an MFRR (21.6/2.16) value of 27 to 40, and the second polyethylene resin has an MFRR (21.6/2.16) value of 15 to 23, and having a haze of 10% or less at a thickness of 90 μm to 110 μm.

As described above, although existing LLDPEs (linear low-density polyethylenes) have excellent mechanical properties, they have poor bubble stability, and thus there is a problem in that it is difficult to stably form a film by a melt blown process, etc. To solve this problem, a method of using a blend of LLDPE and LDPE (low-density polyethylene) has been suggested. When this method is used, bubble stability is improved, and as a result, a blown film may be stably formed by the melt blown process. However, the method generates a problem of remarkably reducing mechanical properties of the existing LLDPE, even though a very small amount of LDPE is added to LLDPE. It was also confirmed that transparency is greatly reduced with increasing thickness of the film.

Accordingly, the present inventors have developed a novel polyethylene resin having improved bubble stability while exhibiting mechanical properties equivalent to or superior to those of existing LLDPE by introducing LCB (long chain branch) into LLDPE, and this polyethylene resin is disclosed in Korean Patent Publication No. 2017-0099694.

However, the film of the polyethylene resin was also found to have disadvantages of a very high haze and unsatisfactory transparency.

Accordingly, as a result of continuous studies, the present inventors found that when a film is manufactured by blending a first polyethylene resin obtained by a known method disclosed in Korean Patent Publication No. 2017-0099694 with a second polyethylene resin having a density equivalent to that of the first polyethylene resin and an MFRR (21.6/2.16) value different from that of the first polyethylene resin, it is possible to provide a polyethylene resin film having more improved transparency, i.e., a low haze of 10% or less while maintaining excellent mechanical properties, processability, and bubble stability of the first polyethylene resin, thereby completing the present invention.

This is likely because the film is manufactured by blending the first and second polyethylene resins having different MFRR (21.6/2.16) values in the above-described range at a predetermined weight ratio, e.g., at a weight ratio of 6:4 to 8:2, or 7:3 to 8:2 to generate a smaller crystal structure of the polyethylene resin, as confirmed in FIG. 3. It is inferred that formation of the crystal structure smaller than the respective structures of the first and second polyethylene resins by blending thereof is attributed to prevention of spherulite production by LCB (Long Chain Branch) present in the structure of the first polyethylene resin and physical interaction between the first and second polyethylene resins.

As a result, the polyethylene resin film according to one embodiment may exhibit more improved transparency than any polyethylene resin film previously known, and may exhibit mechanical properties, processability, and bubble stability equivalent to or higher than the known film, thereby being very preferably applied to various fields.

Hereinafter, respective components of the polyethylene resin film of one embodiment will be described in more detail.

The first and second polyethylene resins included in the film of one embodiment may be equivalent to each other in terms of a density, a number average molecular weight, a weight average molecular weight, and a melt index. Therefore, the first and second polyethylene resins may exhibit excellent compatibility with each other, and the film of one embodiment may exhibit more excellent physical properties such as transparency, etc.

For example, the first and second polyethylene resins may have a density of 0.910 $g/cm^3$ to 0.930 $g/cm^3$, or 0.915 $g/cm^3$ to 0.925 $g/cm^3$, or 0.918 $g/cm^3$ to 0.923 $g/cm^3$. Further, the first and second polyethylene resins may have a number average molecular weight of 20,000 g/mol to 50,000 g/mol, or 30,000 g/mol to 48,000 g/mol, or 35,000 g/mol to 47,000 g/mol, and a weight average molecular weight of 100,000 g/mol to 160,000 g/mol, or 110,000 g/mol to 150,000 g/mol, or 113,000 g/mol to 130,000 g/mol. Further, the first and second polyethylene resins may have a melt index of 0.5 g/10 min to 3 g/10 min, or 0.7 g/10 min to 2 g/10 min, or 0.8 g/10 min to 1.5 g/10 min, as measured in accordance with ASTM D1238 at a temperature of 190° C. under a load of 2.16 kg.

However, the first and second polyethylene resins may be distinguished from each other by an MFRR (21.6/2.16) value and a melt strength, the MFRR (21.6/2.16) value obtained by dividing a melt flow rate ($MFR_{21.6}$) measured at a temperature of 230° C. under a load of 21.6 kg in accordance with ISO 1133 by a melt flow rate ($MFR_{2.16}$) measured at a temperature of 230° C. under a load of 2.16 kg in accordance with ISO 1133.

For example, the first polyethylene resin may have an MFRR (21.6/2.16) value of 27 to 40, or 27 to 35, or 28 to 32, and the second polyethylene resin may have an MFRR (21.6/2.16) value of 15 to 23, or 18 to 23, or 19 to 22.5.

Further, the first polyethylene resin may have a melt strength of 60 mN or more, or 60 mN to 100 mN, or 80 mN to 98 mN, and the second polyethylene resin may have a melt strength of 50 mN or less, or 20 mN to 50 mN, or 30 mN to 40 mN.

When the first and second polyethylene resins have the MFRR (21.6/2.16) values and the melt strengths in the above range, compatibility of the resins may be further improved, and the size of the crystal structure becomes smaller in the film of one embodiment, leading to improvement in transparency and physical properties. In contrast, when any one of the first and second polyethylene resins has an MFRR (21.6/2.16) value out of the above range, or the polyethylene resin having an MFRR (21.6/2.16) value out of the above range is added, the film of one embodiment was found to exhibit relatively poor transparency.

Meanwhile, the above-described first polyethylene resin may be prepared and provided, for example, according to a method known in Korean Patent Publication No. 2017-0099694, such that it has the above-described physical properties, or a resin satisfying the above-described physical properties may be selected from commercially available resins under product names of SE1020NX, SE1020A, SE1020LX, etc. Further, the second polyethylene resin may be a resin satisfying the above-described physical properties selected from those generally known or commercially available LLDPE products.

The first and second polyethylene resins may be, for example, a copolymer of ethylene and alpha olefin. In this regard, the alpha olefin may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and mixtures thereof. Among them, the olefin polymer may be a copolymer of ethylene and 1-hexene.

Further, as described above, the film of one embodiment may include the first and second polyethylene resins at a weight ratio of, for example, 6:4 to 8:2, or 7:3 to 8:2. Accordingly, the film of one embodiment may exhibit more improved transparency and excellent physical properties, as described above. When the weight ratio of the first and second polyethylene resins exceeds the above range, the haze of the film of one embodiment may be increased, and as a result, transparency may become poor or physical properties such as mechanical properties, etc. may be deteriorated.

The film of one embodiment may be manufactured by blending the first and second polyethylene resins at the above weight ratio, and then by performing a common melt blown process, etc. However, the method of manufacturing the film is not limited thereto, and a common process of manufacturing the film may be applied without particular limitation. Thus, additional description thereof will be omitted.

The polyethylene resin film of one embodiment obtained by the above-described method may have excellent transparency defined by a haze of 10% or less, more specifically, a haze of 1% to 10%, or 3% to 9%, for example, in the state of a final film having a thickness of 90 μm to 110 μm.

In particular, the first polyethylene resin exhibits a haze of 10% to 30% in the state of a final film having the same thickness, and the second polyethylene resin exhibits a haze of more than 30% in the state of a final film having the same thickness, whereas the film of one embodiment obtained by blending the resins at the predetermined weight ratio may surprisingly exhibit a very low haze of 10% or less and greatly improved transparency. This is likely attributed to reduction in the size of the crystal structure by interaction between the first and second polyethylene resins and prevention of spherulite production, as described above.

Meanwhile, the film of one embodiment may exhibit the density, molecular weight, and melt index equivalent to those of the above-described first and second polyethylene resins, in addition to the above-described transparency.

For example, the film of one embodiment may have a density 0.910 g/cm$^3$ to 0.930 g/cm$^3$, or 0.915 g/cm$^3$ to 0.925 g/cm$^3$, or 0.918 g/cm$^3$ to 0.923 g/cm$^3$, as measured in the state of a final film. Further, the film of one embodiment may have a number average molecular weight of 20,000 g/mol to 50,000 g/mol, or 30,000 g/mol to 48,000 g/mol, or 40,000 g/mol to 45,000 g/mol, and a weight average molecular weight of 100,000 g/mol to 160,000 g/mol, or 110,000 g/mol to 150,000 g/mol, or 115,000 g/mol to 120,000 g/mol, as measured in the state of a final film. Further, the film of one embodiment may have a melt index of 0.5 g/10 min to 3 g/10 min, or 0.7 g/10 min to 2 g/10 min, or 0.8 g/10 min to 1.5 g/10 min, as measured in the state of a final film at a temperature of 190° C. under a load of 2.16 kg.

Further, the film of one embodiment may have an MFRR (21.6/2.16) of 23 to 27 or 25 to 26.8, as measured in the state of a final film. Further, the film of one embodiment may have a melt strength of 50 mN or more, or 50 mN to 90 mN, or 60 mN to 85 mN.

As such, the film of one embodiment may exhibit excellent melt processability and mechanical properties as well as greatly improved transparency (low haze), thereby being very preferably applied to various fields/uses.

Hereinafter, the actions and effects of the present invention will be described in more detail with reference to the specific examples. However, these examples are for illustrative purposes only, and the scope of the present invention is not intended to be limited by these examples.

Comparative Example 1: Polyethylene Resin Film

SE1020LX (product name, manufactured by LG Chem, Ltd.) was used as a polyethylene resin. This polyethylene resin was used to obtain a polyethylene resin film having a thickness of 100 μm of Comparative Example 1 by a melt blown process to which the following film formation conditions were applied.

Film formation conditions: Screw rpm-30 rpm, process temperature 170° C., Die gap 3 mm, Dies 100 mm; BUR 3.0, Temp 170° C.

Comparative Example 2: Polyethylene Resin Film

A polyethylene resin film was obtained in the same manner as in Comparative Example 1, except that LLDPE of SP312 (product name, manufactured by LG Chem, Ltd.) was used as a polyethylene resin.

Comparative Example 3: Polyethylene Resin Film

A polyethylene resin film was obtained in the same manner as in Comparative Example 1, except that a blend of LLDPE of HY4200 (product name, manufactured by Hanwha Chemical Corp.) and LDPE was used as a polyethylene resin.

Comparative Example 4: Polyethylene Resin Film

A polyethylene resin film was obtained in the same manner as in Comparative Example 1, except that UL912 (product name, manufactured by Lotte Chemical Corp.) was used as a polyethylene resin.

Example 1: Polyethylene resin film

The polyethylene resin of Comparative Example 1 was used as a first polyethylene resin and the polyethylene resin of Comparative Example 2 was used as a second polyethylene resin. The first and second polyethylene resins were blended at a weight ratio of 7:3. This blend was used to obtain a polyethylene resin film in the same manner as in Comparative Example 1.

Example 2: Polyethylene Resin Film

The polyethylene resin of Comparative Example 1 was used as a first polyethylene resin and the polyethylene resin of Comparative Example 2 was used as a second polyethylene resin. The first and second polyethylene resins were blended at a weight ratio of 8:2. This blend was used to obtain a polyethylene resin film in the same manner as in Comparative Example 1.

Example 3: Polyethylene Resin Film

The polyethylene resin of Comparative Example 1 was used as a first polyethylene resin and the polyethylene resin of Comparative Example 2 was used as a second polyethylene resin. The first and second polyethylene resins were blended at a weight ratio of 6:4. This blend was used to obtain a polyethylene resin film in the same manner as in Comparative Example 1.

Comparative Example 5: Polyethylene Resin Film

The blend of the first and second polyethylene resins at a weight ratio of 7:3, which was obtained in Example 1, was further blended with the polyethylene resin of Comparative Example 4. The blend of Example 1 and the polyethylene resin of Comparative Example 4 were blended at a weight ratio of 5:5. This blend was used to obtain a polyethylene resin film in the same manner as in Comparative Example 1.

Comparative Example 6: Polyethylene Resin Film

The polyethylene resin of Comparative Example 1 was used as a first polyethylene resin and the polyethylene resin of Comparative Example 2 was used as a second polyethylene resin. The first and second polyethylene resins were blended at a weight ratio of 5:5. This blend was used to obtain a polyethylene resin film in the same manner as in Comparative Example 1.

Experimental Example: Evaluation of Physical Properties of Polyethylene Resin Films Physical properties of the films manufactured in Examples and Comparative Examples were evaluated by the following methods. For reference, it was confirmed that physical properties of the polyethylene resins used as raw materials in Examples and Comparative Examples were equivalent to those of the films thereof.

(1) Density (g/cm$^3$): Density was measured in accordance with ASTM D792.

(2) Measurement of molecular weight (Mw, Mn): Weight average molecular weights (Mw) and number average molecular weights (Mn) were measured by GPC (gel permeation chromatography, manufactured by Water).

A PLgel MIX-B 300 mm column (Polymer Laboratories) and Waters PL-GPC220 instrument were used for evaluation. A temperature for evaluation was 160° C., and 1,2,4-trichlorobenzene was used as a solvent. A flow rate was 1 mL/min. Samples were prepared at a concentration of 10 mg/10 mL, and provided in a volume of 200 μL. A calibration curve obtained by using polystyrene standards was used to induce values of Mw and Mn. Molecular weights of polystyrene standards were 9 kinds of 2,000/10,000/30,000/70,000/200,000/700,000/2,000,000/4,000,000/10,000,000.

(3) $MI_{2.16}$ and MFRR (21.6/2.16): Melt Index ($MI_{2.16}$) was measured in accordance with ASTM D1238 (condition E, 190° C., load of 2.16 kg). Melt Flow Rate Ratio (MFRR (21.6/2.16)) was calculated by dividing $MFR_{21.6}$ by $MFR_{2.16}$, $MFR_{21.6}$ was measured in accordance with ISO 1133 at a temperature of 230° C. under a load of 21.6 kg, and $MFR_{2.16}$ was measured in accordance with ISO 1133 at a temperature of 230° C. under a load of 2.16 kg.

(4) Melt Strength: melt strength was measured using a Goettfert Rheotens 71.97 attached to a Model 3211 Instron capillary rheometer. A melt of the polyethylene resin film was extruded through a capillary die (flat die, 180 degree angle) with a ratio (L/D) (length (L) to diameter (D)) of 15. After equilibrating the samples at 190° C. for 10 minutes, the piston was run at a speed of 1 inch/minute (2.54 cm/min). The standard test temperature was 190° C. The sample was drawn uniaxially to a set of accelerating nips located 100 mm below the die with an acceleration of 1.2 mm/s². The tensile force was recorded as a function of the take-up speed of the nip rolls. Melt strength was reported as the plateau force (mN) before the strand broke. The following conditions were used in the melt strength measurements.

Plunger speed: 0.423 mm/s
Capillary die L/D: 15
Shear rate: 72/s
Wheel initial speed: 18 mm/s
Wheel acceleration: 12 mm/s²
Barrel diameter: 9.52 mm
Shear rate: 100~150 mean value (5) Haze (%): Haze was measured in accordance with ISO 13468. At this time, the thickness of the film specimen was 90 μm to 110 μm. The measurement was repeated 10 times for each specimen, and mean values thereof were taken.

The respective physical properties measured as above are summarized in Table 1 below. Optical microscopic images of the polyethylene resin films manufactured in Comparative Examples 2 and 3 and Example 1 are shown in FIGS. 1 to 3, respectively.

different from those of the first and second polyethylene resins were found to exhibit poor transparency (high haze), as compare with the films of Examples.

Further, the film of Comparative Example 3 which was manufactured by blending of general LLDPE and LDPE, or the film of Comparative Example 5 which was manufactured by further blending of the composition of Example 1 with the polyethylene resin of Comparative Example 4, and the film of Comparative Example 6, in which the weight ratio of the first and second polyethylene resins was less than 6:4, were also found to exhibit poor transparency, as compare with the films of Examples.

This is likely attributed to the reduced size of the crystal structure due to blending of the first and second polyethylene resins at the optimal weight ratio, as confirmed in the optical microscopic images of FIGS. 1 to 3.

The invention claimed is:

1. A polyethylene resin film having a density of 0.910 g/cm³ to 0.930 g/cm³, a haze of 10% or less at a thickness of 90 μm to 110 μm, and a MFRR (21.6/2.16) value of 23 to 27,
comprising a first polyethylene resin and a second polyethylene resin at a weight ratio of 6:4 to 8:2, wherein the first polyethylene resin has an MFRR (21.6/2.16) value of 27 to 40, and the second polyethylene resin has an MFRR (21.6/2.16) value of 15 to 23, and the MFRR (21.6/2.16) value is obtained by dividing a melt flow rate ($MFR_{21.6}$) measured at a temperature of 230° C. under a load of 21.6 kg in accordance with ISO 1133 by a melt flow rate ($MFR_{2.16}$) measured at a temperature of 230° C. under a load of 2.16 kg in accordance with ISO 1133.

2. The polyethylene resin film of claim 1, wherein the first polyethylene resin has a melt strength of 60 mN or more and the second polyethylene resin has a melt strength of 50 mN or less.

3. The polyethylene resin film of claim 1, wherein the first and second polyethylene resins have a number average

TABLE 1

| | Unit | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|
| Mn | — | 41,000 | 40,000 | 43,000 | 38,000 | 47,000 | 26,000 | 32,000 | 36,000 | 45,000 |
| Mw | — | 118,000 | 116,000 | 119,500 | 114,000 | 122,000 | 88,000 | 110,000 | 114,000 | 120,000 |
| MI2.16 | g/10 min | 0.96 | 0.94 | 0.99 | 0.93 | 1.01 | 0.96 | 1.07 | 1.01 | 1.0 |
| MFRR (21.6/2.16) | — | 25.5 | 26.3 | 23.8 | 28.9 | 22.2 | 34.1 | 26.9 | 26.3 | 23.5 |
| Density | g/cm³ | 0.919 | 0.920 | 0.919 | 0.920 | 0.918 | 0.920 | 0.920 | 0.920 | 0.919 |
| Melt Strength | | 82 | 86 | 76 | 96 | 34 | 101 | 87 | 84 | 69 |
| Haze 100 μm | % | 7.2 | 7.0 | 9.3 | 12.3 | 36.5 | 17.3 | 15.7 | 11.6 | 14.6 |

Referring to FIG. 1, since each of the films of Examples 1 to 3 was manufactured by blending the first and second polyethylene resins at the predetermined ratio, they were found to exhibit the low haze, excellent mechanical properties (molecular weight, etc.) and processability (melt index, etc.).

In contrast, the film of Comparative Example 1 which was manufactured only by the first polyethylene resin and the film of Comparative Example 2 which was manufactured only by the second polyethylene resin, or the film of Comparative Example 4 which was manufactured only by the separate polyethylene resin having an MFRR value molecular weight of 20,000 g/mol to 50,000 g/mol and a weight average molecular weight of 100,000 g/mol to 160,000 g/mol.

4. The polyethylene resin film of claim 1, wherein the first and second polyethylene resins have a melt index of 0.5 g/10 min or more and less than 3 g/10 min, as measured in accordance with ASTM D1238 at a temperature of 190° C. under a load of 2.16 kg.

5. The polyethylene resin film of claim 1, wherein the first and second polyethylene resins are a copolymer of ethylene and alpha olefin.

6. The polyethylene resin film of claim 5, wherein the alpha olefin is propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or mixtures thereof.

7. The polyethylene resin film of claim 5, wherein the alpha olefin is 1-hexene.

8. The polyethylene resin film of claim 1, wherein the polyethylene resin film has a number average molecular weight of 20,000 g/mol to 50,000 g/mol and a weight average molecular weight of 100,000 g/mol to 160,000 g/mol.

9. The polyethylene resin film of claim 1, wherein the polyethylene resin film has a melt strength of 50 mN or more.

10. The polyethylene resin film of claim 1, wherein the polyethylene resin film has a melt index of 0.5 g/10 min to 3 g/10 min, as measured at a temperature of 190° C. under a load of 2.16 kg.

11. The polyethylene resin film of claim 1, wherein the first and second polyethylene resins have a density, a number average molecular weight, a weight average molecular weight, and a melt index equivalent to each other.

12. The polyethylene resin film of claim 1, wherein the first and second polyethylene resins have a density of 0.910 g/cm$^3$ to 0.930 g/cm$^3$.

13. The polyethylene resin film of claim 1, wherein the first polyethylene resin has a haze of 10% to 30% in the state of a film having the same thickness, and the second polyethylene resin has a haze of more than 30% in the state of a film having the same thickness.

* * * * *